United States Patent [19]
Bugnon et al.

[11] Patent Number: 4,880,472
[45] Date of Patent: Nov. 14, 1989

[54] ORGANIC PIGMENTS COATED WITH METAL OXIDES

[75] Inventors: Philippe Bugnon, Essert; Arnold Grubenmann, Marly; Bernhard Medinger, Giffers, all of Switzerland; Jean Schaeflé, Mulhouse, France

[73] Assignee: Ciba-Geigy Corporation, Ardsley, N.Y.

[21] Appl. No.: 202,865

[22] Filed: Jun. 6, 1988

[30] Foreign Application Priority Data

Jun. 16, 1987 [CH] Switzerland .......................... 2256/87

[51] Int. Cl.$^4$ ................................................ C08K 5/00
[52] U.S. Cl. ..................................... 106/493; 106/445; 106/481; 106/491
[58] Field of Search ................ 106/445, 481, 491, 493

[56] References Cited

U.S. PATENT DOCUMENTS

| | | | |
|---|---|---|---|
| 2,885,366 | 5/1959 | Iler | 252/313 |
| 3,025,173 | 3/1962 | Bernstein | 106/32 |
| 3,370,971 | 2/1968 | Linton | 106/298 |
| 3,470,007 | 11/1969 | Linton | 106/298 |
| 3,485,658 | 7/1967 | Iler | 117/69 |
| 3,639,133 | 2/1972 | Linton | 106/298 |
| 4,107,133 | 8/1978 | Sawai | 260/42.15 |
| 4,139,660 | 2/1979 | Tur | 427/353 |

FOREIGN PATENT DOCUMENTS

| | | |
|---|---|---|
| 0057388 | 1/1981 | European Pat. Off. . |
| 0254861 | 2/1988 | European Pat. Off. . |
| 50-51527 | 5/1975 | Japan . |
| 51-74039 | 6/1976 | Japan . |
| 7207051 | 5/1972 | Netherlands . |

OTHER PUBLICATIONS

C.A., 83, 117172n.
C.A., 85, 161231w.
C.A., 92, 148707f.
Derwent, 76553u-AEG.

Primary Examiner—Paul Lieberman
Assistant Examiner—Willie J. Thompson
Attorney, Agent, or Firm—Luther A. R. Hall; Stephen V. O'Brien

[57] ABSTRACT

Compositions containing an organic pigment coated with metal oxides, wherein the pigment particles are provided with a tenacious, dense, highly crosslinked coating of silica and/or alumina which is fixed by polycondensation of a silicate and/or aluminate with the free hydroxyl groups of a layer that densely coats the surface of the pigment particles and which consists substantially of partially hydrolyzed compounds of elements of group 4A or 4B of the Periodic Table selected from the group consisting of chelates of formula

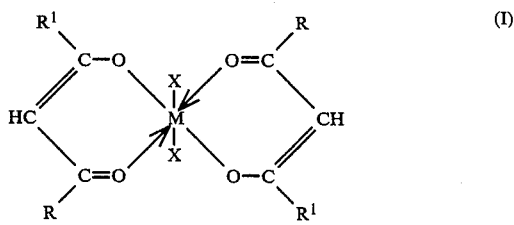

or

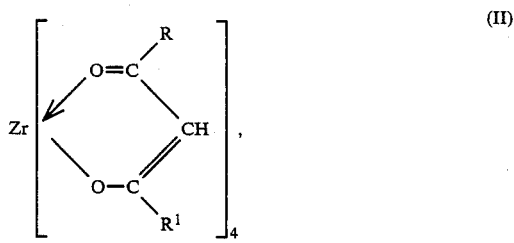

wherein R is methyl, ethyl, methoxy or ethoxy, $R^1$ is methyl or ethyl and X is halogen or $C_1$–$C_4$alkoxy, and M is Ti or Sn, and of esters of formula $$Q(OR^2)_4 \qquad (III),$$

wherein Q is an element of group 4A or 4B of the Periodic Table and $R^2$ is $C_1$–$C_4$alkyl.

Pigment compositions of this kind are distinguished in particular by excellent rheological properties in varnish and printing ink systems, by high gloss of the finishes obtained therewith, and by substantial non-deformation of the plastic mouldings pigmented therewith.

16 Claims, No Drawings

ORGANIC PIGMENTS COATED WITH METAL OXIDES

The present invention relates to organic pigments, the particles of which are provided with a tenacious coating of metal oxides fixed by means of an interlayer which contains hydroxyl groups. They are distinguished by excellent properties, especially by very good rheological properties.

It is commonly known to coat solid materials with a protective layer of metal oxides, especially of silica and/or alumina, and such products are described, for example, in U.S. Pat. Nos. 2,885,366 and 3,485,658. The former patent specification specifically mentions, for example, coating rutile with silica. It is known, for example, from U.S. Pat. Nos. 3,370,971, 3,470,007 and 3,639,133, that coating inorganic pigment particles, especially lead chromates, with silica, if desired in conjunction with alumina, makes it possible to enhance the properties of said pigments. That organic pigments have also been coated with silica is known from Japanese published patent applications 75/51527, 76/74039 and 79/160433; and Netherlands patent application 72/7051 describes coating organic pigments with a layer of silica and water-soluble metal salts of, for example, $Sn^{4+}$, $Ti^{4+}$ or $Zr^{4+}$. The results obtained with these methods are, however, not entirely satisfactory, for these coatings are easily removed, especially in solvent systems such as varnishes.

European patent application A-57 388 and U.S. Pat. No. 4,139,660 teach that it is possible to increase the surface tension, and thereby the wettability, of solid substrates by treatment with organometallic compounds or salts of elements of the 4th main or auxiliary group of the Periodic Table. In U.S. Pat. No. 4,139,660, attention is expressly drawn to the fact that no hydrolysis should take place in the course of the application. A colourant formulation for polyethylene, which consists of organic pigments containing an organosilane compound and/or an organotitanium compound, is disclosed in German Offenlegungsschrift 2 501 251. A method of coating pigment particles with titanium hydrate is disclosed in U.S. Pat. No. 3,025,173. However, even the pigment compositions obtained by these methods are not satisfactory in all respects, as the coatings are easily removed, for example in varnishes, especially in high-solid systems containing hyperdispersants (q.v. J. S. Hampton, J. F. MacMillan, American Ink Maker, January 1985, p. 16 et seq.), which find increasing use at the present time.

Quite contrary to expectations, it has now been found that the very hydrolysis hitherto regarded as undesirable is required to solve this problem and that organic pigments provided with a tenacious coating of silica or alumina can be obtained by fixing said coating to the pigment particles by means of an interlayer which contains hydroxyl groups and consists of partially hydrolysed chelates or alkyl esters of acids of elements of groups 4A or 4B of the Periodic Table.[1] The shortcomings of the pigment compositions of the above mentioned kind are thereby overcome.

[1] Grant & Hackh's Chemical Dictionary, fifth edition, 1987

Accordingly, the present invention relates to compositions containing an organic pigment coated with metal oxides, wherein the pigment particles are provided with a tenacious, dense, highly crosslinked coating of silica and/or alumina which is fixed by polycondensation of a silicate and/or aluminate with the free hydroxyl groups of a layer that densely coats the surface of the pigment particles and which consists substantially of partially hydrolysed compounds of elements of group 4A or 4B of the Periodic Table selected from the group consisting of chelates of formula

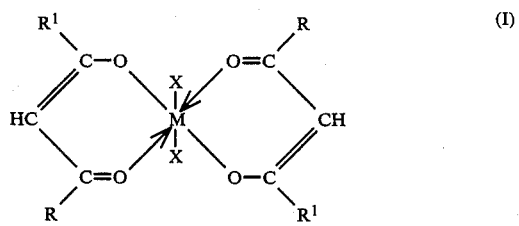

or

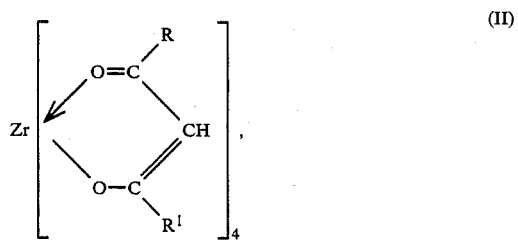

wherein R is methyl, ethyl, methoxy or ethoxy, $R^1$ is methyl or ethyl and X is halogen or $C_1$-$C_4$alkoxy, and M is Ti or Sn, and of esters of formula

wherein Q is an element of group 4A or 4B of the Periodic Table and $R^2$ is $C_1$-$C_4$alkyl.

R is preferably methyl or ethoxy and the preferred meaning of $R^1$ is methyl.

X as halogen is, for example, bromine, iodine and, preferably, chlorine.

X as $C_1$-$C_4$alkoxy may be methoxy, ethoxy, n-propoxy, isopropoxy, n-butoxy, sec-butoxy or tert-butoxy.

The preferred meaning of X in formula I, if M is Ti, is $C_1$-$C_4$alkoxy, preferably isopropoxy.

The preferred meaning of X in formula I, if M is Sn, is halogen, in particular chlorine.

$R^2$ as $C_1$-$C_4$alkyl may be methyl, ethyl, n-propyl, isopropyl, n-butyl, sec-butyl or tert-butyl, and is preferably ethyl, n-propyl, isopropyl or n-butyl. Q is, for example, Sn, Si, Pb, Ge, Ti or Zr. Preferably Q is Si, Ti or Zr.

Compounds of formula II are preferred.

If the pigment particles are coated with silica, then the polycondensation with silicates is effected via "active" silica, the nature and preparation of which is described, for example, in U.S. Pat. Nos. 3,370,971 and 3,639,133. It is preferred to start from silicic acid, metasilicates or, in particular, from commercial sodium silicate.

If the pigments are coated with alumina, the polycondensation is carried out in situ from alumina formed from an aluminate. The alumina can be obtained, for example, direct from a water-soluble sodium, potassium or magnesium aluminate, in the presence of dilute mineral acid and at a pH in the range from 5 to 10, or from an aqueous aluminate by adjusting the pH to a value from 5 to 7. It is preferred to use sodium aluminate or aluminium sulfate.

If an aluminate is used, dense, substantially amorphous alumina ("dense alumina") is obtained at pH 5–7, and substantially crystalline alumina ("boehmite") at pH 7–10.

It is also possible to use an $SiO_2$ as well as an $Al_2O_3$ donor (selected from the compounds described above) or a mixture of the two, so that a mixed coating of silica and alumina is formed.

All customary organic pigments, for example azo pigments, quinacridones, phthalocyanines, indanthrones, flavanthrones, pyranthrones, perylenes, dioxazines, perinones, thioindigo, quinophthalones and, in particular, diketopyrrolopyrroles, isoindolines, isoindolinones and metal complexes, are suitable for the preparation of the compositions of this invention, which is carried out as described below.

The organic pigment is dispersed by conventional methods in water or a lower alkyl alcohol (e.g. methyl, ethyl, n-propyl, isopropyl, n-butyl, sec-butyl, tert-butyl or amyl alcohol). To this suspension is conveniently added 1 to 15% by weight, preferably 2 to 7% by weight, based on the pigment, of a compound of formula I, II or III, in each case calculated as oxide, in powder form or as solution.

The mixture is normally stirred for at least one hour in the temperature range from 20° to 50° C. Depending on the reagent employed, the pH is from 2 to 6. The pH is raised by at least two units to initiate the partial hydrolysis. Suitable bases are inorganic as well as organic compounds, for example aqueous sodium hydroxide, aqueous potassium hydroxide, ammonia, sodium alcoholate, potassium alcoholate or pyridine. The hydrolysis can also be initiated by raising the temperature. Thereafter stirring is continued in the temperature range from 50° to 80° C., whereupon the pH gradually falls. As soon as the pH is stable (1–20 hours, depending on the temperature and reagents), the reaction mixture is cooled, filtered, and the filter cake is washed with water.

The filter cake moist with water so obtained is suspended in water. However, it also suffices to dilute the suspension with at least the same amount of water after the hydrolysis and without isolating the product.

The suspension is heated, with stirring, to 60°–100° C. and then 0.5 to 50, preferably 1 to 25 and, most preferably, 2 to 12% by weight of active silica or alumina formed in situ is added. Stirring is continued for 2 to 6 hours and the batch is then neutralised and filtered. The filter residue is washed with water and dried at 80°–120° C. in a vacuum drying oven.

Active silica is also obtained, for example, by adjusting the suspension, heated to 60°–100° C., to pH 7–10 with one of the organic or inorganic bases referred to above, then slowly adding sodium silicate and sulfuric acid together in the desired amount, while ensuring that the pH always remains in the alkaline range.

$Al_2O_3$ formed in situ is obtained, for example, by slowly adding either a solution of sodium aluminate to the suspension, heated to 60°–100° C., up to pH 5–9 and keeping the pH constant by addition of sulfuric acid, or by adding a solution of aluminium sulfate up to pH 5–7 and keeping the pH in this range by addition of aqueous sodium hydroxide.

It has also been found that even the first coating with a partially hydrolysed compound of formula I, II or III adheres very firmly and, most surprisingly, imparts to the product good properties, especially rheological properties.

Compositions containing an organic pigment, the particles of which are coated with a dense layer which consists substantially of partially hydrolysed organic compounds of elements of group 4A or 4B of the Periodic Table selected from the group consisting of chelates of formula

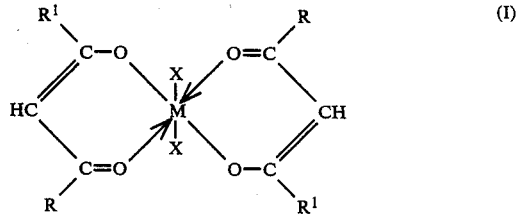

or

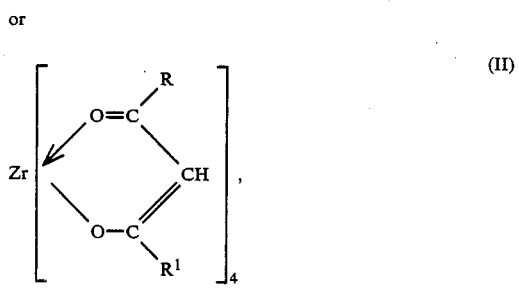

wherein R is methyl, ethyl, methoxy or ethoxy, $R^1$ is methyl or ethyl and X is halogen or $C_1$–$C_4$alkoxy, and M is Ti or Sn, and of esters of formula $Q(OR^2)_4$                   (III), wherein Q is an element of group 4A or 4B of the Periodic Table and $R^2$ is $C_1$–$C_4$alkyl, are also novel and thus constitute a further object of the invention.

They are obtained as described above by cooling the suspension after the hydrolysis as soon as the pH is stable, filtering the suspension, and washing the filter product with water and drying it at 80°–120° C. in a vacuum drying oven.

Compounds of formula II are preferred.

The compositions of this invention are suitable for use as pigments for colouring high molecular organic material.

Examples of high molecular organic materials which may be coloured or pigmented with the compositions of this invention are cellulose ethers and esters such as ethyl cellulose, nitrocellulose, cellulose acetate, cellulose butyrate, natural resins or synthetic resins such as polymerisation resins or condensation resins, for example aminoplasts, in particular urea/formaldehyde and melamine/formaldehyde resins, alkyd resins, phenolic plastics, polycarbonates, polyolefins, polystyrene, polyvinyl chloride, polyamides, polyurethanes, polyesters, rubber, casein, silicone and silicone resins, singly or in mixtures.

Also suitable are high molecular organic materials in dissolved form as film formers, e.g. boiled linseed oil, nitrocellulose, alkyd resins, phenolic resins, melamine resins, acrylic resins and urea/formaldehyde resins.

The above high molecular compounds may be singly or as mixtures in the form of plastics, melts or of spinning solutions, varnishes, paints or printing inks. Depending on the end use, it is advantageous to use the compositions of the invention as toners or in the form of preparations. The compositions of the invention are preferably employed in an amount of 0.01 to 30% by weight, preferably 0.1 to 10% by weight, based on the high molecular organic material to be pigmented.

The pigmenting of the high molecular organic compounds with the compositions of the invention is carried out for example by incorporating such a composition, if appropriate in the form of a masterbatch, into the substrates using roll mills, mixing or grinding machines. The pigmented material is then brought into the desired final form by methods which are known per se, for example calendering, moulding, extruding, coating, spinning, casting or by injection moulding. It is often desirable to incorporate plasticisers into the high molecular compounds before processing in order to produce non-brittle mouldings or to diminish their brittleness. Suitable plasticisers are for example esters of phosphoric acid, phthalic acid or sebacic acid. The plasticisers may be incorporated before or after working the composition into the polymers. To obtain different shades, it is also possible to add fillers or other chromophoric components such as white, coloured or black pigments, in any amount, to the high molecular organic compounds, in addition to the composition of this invention.

For pigmenting varnishes and printing inks, the high molecular organic materials and the compositions of the invention, together with optional additives such as fillers, other pigments, siccatives or plasticisers, are finely dispersed or dissolved in a common organic solvent or mixture of solvents. The procedure may be such that the individual components by themselves, or also several jointly, are dispersed or dissolved in the solvent and subsequently all the components are mixed.

The colourations obtained, for example in plastics, filaments, varnishes or prints, have good allround fastness properties such as good dispersibility, high transparency, good fastness to over-spraying, migration, heat, light, and weathering.

The compositions of this invention and, in general, especially those containing pigments which are coated with silica and/or alumina, are distinguished most particularly by outstanding rheological properties in varnish and printing ink systems, by high gloss and excellent "DOI" (distinctness of image) of the finishes obtained therewith, and by substantial non-deformation of the plastic mouldings pigmented therewith.

Because of the good rheological properties of the pigment compositions of this invention, it is possible to prepare varnishes with high loadings of pigment.

The compositions of this invention are preferably suitable for colouring aqueous and/or solvent-containing varnishes, especially automotive varnishes. The most preferred utility is for metallic effect finishes.

The invention is illustrated by the following Examples, in which percentages are by weight, unless otherwise indicated.

Coating with hydrolysed compounds of formula I, II or III

EXAMPLE 1

A slurry of 50 g of the isoindolinone pigment, C.I. Pigment Yellow 110, in 620 g of water is dispersed by passing it three times through a high pressure homogeniser (Gaulin LAB 60 ®, supplied by Schroeder APV). To this dispersion, which is heated to 50° C., are added 16 g of zirconium (IV) acetylacetonate (=7.4% $ZrO_2$, based on pigment), with stirring. The mixture is then cooled to room temperature and stirred for 6 hours. After heating once more to 65° C., the pH is raised to 8.7 by addition of ca. 70 ml of 1N NaOH and the suspension is stirred for 17 hours, during which time the pH gradually falls to 5.8. After the suspension has cooled, the product is isolated by filtration, washed with water and dried at 80° C. in a vacuum drying oven. The resultant pigment contains 5.3% Zr.

EXAMPLE 2

20 g of the metal complex pigment, C.I. Pigment Yellow 129, are dispersed in 200 ml of water for 4 hours with a toothed disc agitator. To this dispersion, which is heated to 50° C., are added 4 g of zirconium(IV) acetylacetonate (=5% $ZrO_2$, based on pigment). The mixture is stirred for 1 hour, then heated to 65° C., and the pH is adjusted to 8.5. The suspension is stirred for 16 hours, during which time the pH falls to 5.4. After cooling, the product is isolated by filtration, washed with water and dried at 80° C. in a vacuum drying oven.

EXAMPLE 3

2 g of zirconium(IV) acetylacetonate (=5% $ZrO_2$, based on pigment) are added to 200 g of a 5% aqueous suspension of the diketopyrrolopyrrole pigment, C.I. Pigment Red 255, which has been dispersed in a high pressure homogeniser as described in Example 1. The mixture is heated for 15 minutes to 50° C. and then stirred for 1 hour. The pH is thereafter raised from 4.9 to 8.5 and the temperature brought to 65° C. After 2½ hours the pH is 6.8. Finally, the product is isolated as described in Example 1.

EXAMPLE 4

20 g of C.I. Pigment Yellow 110 are dispersed by the method described in Example 1 in 200 ml of isopropanol instead of in water. Over the course of 30 minutes a solution of 3.55 g of titanium(IV) isopropylate (=5% $TiO_2$, based on pigment) in 50 ml of isopropanol are added to the above dispersion. After 1 hour, 10 ml of a 2% solution of sodium isopropylate in isopropanol are added. The suspension is heated to 70° C. and stirred for 3 hours. After cooling, the product is isolated as described in Example 1.

EXAMPLE 5

20 g of C.I. Pigment Yellow 110 are dispersed in 200 ml of isopropanol as described in Example 4. Then a solution of 2.57 g of tin(IV) dichloroacetylacetonate (=5% $SnO_2$, based on pigment) in 50 ml of ethanol is added over 30 minutes to the above dispersion. After 1 hour, 20 ml of a 2% solution of sodium isopropylate in isopropanol are added and the suspension is heated to 70° C. and stirred for 3 hours. After cooling, the product is isolated as described in Example 1.

EXAMPLE 6

20 g of C.I. Pigment Yellow 110 are dispersed in 200 ml of isopropanol as described in Example 4. Then a solution of 3.45 g of tetraethoxy silicate (=5% $SiO_2$, based on pigment) in 50 ml of isopropanol is added over 30 minutes to the above dispersion. After 1 hour, 10 ml of a 2% solution of sodium isopropylate in isopropanol are added and the suspension is heated to 70° C. and stirred for 3 hours. After cooling, the product is isolated as described in Example 1.

EXAMPLE 7

200 g of a 30% moist filter cake of the diketopyrrolopyrrole pigment, C.I. Pigment Red 255, are dispersed in 460 g of water by the method described in Example 1. With stirring, 11.85 g of zirconium(IV) acetylacetonate (=5% $ZrO_2$, based on pigment) are added to the above dispersion, which has been heated to 50° C. The mixture is then allowed to cool to room temperature and stirred for 15 hours. The batch is heated to 65° C. and the pH is raised to 8.5 by addition of 1N NaOH. The suspension is stirred for 4 hours, during which time the pH falls gradually to 5.8. After the suspension has cooled, 130 g thereof are filtered. The residue is washed with water and dried at 80° C. in a vacuum drying oven.

Additional coating with silica and/or aluminium oxide

EXAMPLE 8

(a) A slurry of 222.5 g of C.I. Pigment Yellow 110 in 3077 g of water is dispersed as described in Example 1. With stirring, 24 g of zirconium(IV) acetylacetonate (=3% $ZrO_2$, based on pigment) are added to the above dispersion, which has been heated to 55° C. The mixture is then allowed to cool to room temperature and stirred for 5 hours. The suspension is heated to 65° C. and the pH is raised to 8.5 by addition of 1N NaOH. The suspension is stirred for 16 hours, during which time the pH gradually falls to 5.7.

(b) Half of the suspension is heated to 90° C. Then 20 g of $Na_2SO_4$ are added and the pH is raised to 8.5 by addition of 1N NaOH. Simultaneously, 19 g of sodium silicate (26.5% $SiO_2$), diluted with 300 ml of water (=5% $SiO_2$, based on pigment) and 45 ml of 0.2M $H_2SO_4$, diluted with 100 ml of water, are added over 1 hour. The pH remains constant at 8.5-8.7. The suspension is then stirred for 4 hours and, after cooling, filtered. The filter residue is washed with water and dried at 80° C. in a vacuum drying oven.

EXAMPLE 9

The second half of the suspension obtained according to Example (8a) is heated to 90° C. The pH is 5.7. Then 80 ml of a 2% aqueous solution of sodium aluminate (=1.6% $Al_2O_3$, based on pigment) are added to the above suspension over 60 minutes. The pH is kept at 8.5 by addition of 0.2M $H_2SO_4$. The suspension is stirred for a further 3 hours at 90° C. Finally, the product is isolated as described in Example (8b).

EXAMPLE 10

20 g of C.I. Pigment Yellow 129 and 4 g of zirconium(IV) acetylacetonate (=5% $ZrO_2$, based on pigment) are dispersed in 200 ml of water for 4 hours with a toothed disc agitator. The suspension is stirred for 1 hour, then heated to 60° C. and the pH is raised from 5.6 to 5.8. While the suspension is being stirred for 15 hours, the pH falls to 5.5. The temperature is then raised to 90° C. and the pH is adjusted to 9.5. Over the course of 50 minutes, 3.8 g sodium silicate (26.5% $SiO_2$), diluted with 100 ml of water (=5% $SiO_2$, based on pigment), are added to the suspension, while keeping the pH at 9-9.5 by the addition, in portions, of a total of 17 ml of 0.2M $H_2SO_4$ (diluted with 70 ml of water). The suspension is stirred for a further 3 hours at 90° C. and the product is subsequently isolated as described in Example (8b).

EXAMPLE 11

The procedure of Example 10 is repeated, with the sole exception that, instead of 20 g of C.I. Pigment Yellow 129, 56 g of a 35.7% aqueous filter cake of the γ-quinacridone pigment, C.I. Pigment Violet 19, are used.

EXAMPLE 12

20 g of C.I. Pigment Yellow 110 are dispersed in 200 ml of isopropanol as described in Example 4. Then a solution of 3.55 g of titanium(IV) isopropylate (=5% $TiO_2$, based on pigment) in 50 ml of isopropanol is added to the above dispersion over 30 minutes. After 1 hour, 10 ml of a 2% solution of sodium isopropylate in isopropanol are added and the suspension is heated to 70° C. and stirred for 3 hours. Then 300 ml of water are added and the suspension is heated to 78° C. The pH is raised from 7.0 to 9.5 by addition of 1N NaOH. To the suspension are added, over the course of 1 hour, 3.8 g of sodium silicate (26.5% of $SiO_2$), diluted with 100 ml of water (=5% $SiO_2$, based on pigment), while keeping the pH at 9-9.5 by addition of 20 ml of 0.2M $H_2SO_4$, diluted with 100 ml water. The suspension is stirred for a further 3 hours and, after cooling, the product is isolated as described in Example (8b).

EXAMPLE 13

20 g of C.I. Pigment Yellow 110 are dispersed in 200 ml of isopropanol as described in Example 4. Then a solution of 2.57 g of tin(IV) dichloroacetylacetonate (=5% $SnO_2$, based on pigment) in 100 ml of ethanol is added over 30 minutes to the above dispersion. After 1 hour, 20 ml of a 2% solution of sodium isopropylate in isopropanol are added and the suspension is heated to 70° C. and stirred for 3 hours. Treatment with sodium silicate (=5% $SiO_2$, based on pigment) and isolation of the product are then effected as described in Example 12.

EXAMPLE 14

20 g of C.I. Pigment Yellow 110 are dispersed in 200 ml of isopropanol as described in Example 4. Then a solution of 3.45 g of tetraethoxy silicate (=5% $SiO_2$, based on pigment) in 100 ml of isopropanol is added over 30 minutes to the above dispersion. After 1 hour, 20 ml of a 2% solution of sodium isopropylate in isopropanol are added and the suspension is heated to 60° C. and stirred for 3 hours. Treatment with sodium silicate (=5% $SiO_2$, based on pigment) and isolation of the product are then effected as described in Example 12.

EXAMPLE 15

126 g of the suspension obtained in Example 7 are heated to 90° C. The pH is raised to 9.5 by addition of 1N NaOH. Simultaneously 1.9 g of sodium silicate (26.5% $SiO_2$), diluted with 50 ml of water (=2.5% $SiO_2$, based on pigment) and 10 ml of 0.2M $H_2SO_4$, diluted with 50 ml of water, are added. the pH remains constant at 8.8-9.3. The suspension is then stirred for a further 3 hours and, finally, the product is isolated as described in Example (8b).

EXAMPLE 16

126 g of the suspension obtained in Example 7 are heated to 85° C. The pH is 5.8. Then 50 ml of a 2% aqueous solution of sodium aluminate (=4% $Al_2O_3$, based on pigment) and 50 ml of a 0.2M solution of $H_2SO_4$ are added simultaneously over 60 minutes to the above suspension. The pH remains constant at ca. 6. The suspension is stirred for 3 hours and the product is finally isolated as described in Example (8b).

EXAMPLE 17

126 g of the suspension obtained in Example 7 are heated to 60° C. Then a solution of 2 g of $Al_2(SO_4)_3.18\text{-}H_2O$ (=1% $Al_2O_3$, based on pigment) in 35 ml of water is added to this suspension over 25 minutes. The pH falls to 3.3 and is slowly raised (over 1 hour) to 6.5 by addition of 140 ml of 1N NaOH. The suspension is stirred for 3 hours and, finally, the product is isolated as described in Example (8b).

EXAMPLE 18

126 g of the suspension obtained in Example 7 are heated to 90° C. The pH is raised to 9.5 by addition of 1N NaOH and then 1.14 g of sodium silicate (=1% $SiO_2$, based on pigment), diluted with 50 ml of water, and 6 ml of 0.2M $H_2SO_4$, diluted with 50 ml of water, are added simultaneously to the above suspension over 1 hour. The suspension is stirred for 40 minutes and then cooled to 60° C. The pH is adjusted to pH 8.5 and then a solution of 0.3 g of $NaAlO_2$ (=1.5% $Al_2O_3$, based on pigment) in 50 ml of water and 11 ml of 0.2M $H_2SO_4$, diluted with 50 ml of water, are added simultaneously over 60 minutes. During this addition the pH remains constant at ~8.5. The suspension is stirred for 3½ hours and, finally, the product is isolated as described in Example (8b).

EXAMPLE 19

126 g of the suspension obtained in Example 7 are heated to 60° C. The pH is adjusted to 3.0 and then 50 ml of a 1% solution of $NaAlO_2$ (=1% $Al_2O_3$, based on pigment) are added over 75 minutes. The pH rises to 8.5 and is kept constant at this value by addition of 0.4M $H_2SO_4$. Stirring is continued for 30 minutes and then the pH is adjusted to 5.7 and another 50 ml of the solution of $NaAlO_2$ (=1% $Al_2O_3$, based on pigment) are added, while keeping the pH constant at 5.7 by addition of 0.4M $H_2SO_4$. The suspension is stirred for a further 2 hours and, finally, the product is isolated as described in Example (8b).

EXAMPLE 20

10 g of the diketopyrrolopyrrole pigment, C.I. Pigment Red 254, are dispersed in 100 ml of isopropanol. To this dispersion is added 0.53 g of zirconium(IV) isopropylate (=2% $ZrO_2$, based on pigment) in powder form. After 30 minutes, 10 ml of a 1.8% solution of sodium isopropylate in isopropanol are added. The suspension is heated to 75° C. and stirred for 6 hours. After cooling, the product is isolated as described in Example 1.

EXAMPLE 21

10 g of C.I. Pigment Red 254 are dispersed in 100 ml of a 4:1 mixture of water/methanol. To this dispersion are added 0.800 g of zirconium(IV) acetylacetonate (=2% $ZrO_2$, based on pigment) in powder form. The suspension is heated to 75° C. and the pH (7.2) is then raised to 8.5 by addition of 1N NaOH. The suspension is stirred for 3 hours, during which time the pH gradually falls to 7.4. The pH is again raised to 8.5 and the suspension is stirred for a further 3 hours. After cooling, the product is isolated as described in Example (8b).

EXAMPLE 22

10 g of C.I. Pigment Yellow 110 are dispersed in 100 ml of isopropanol. To this dispersion are then added, over 10 minutes, 1.3 g of a 75% solution of Ti(IV) diisopropoxy bis(acetyl)acetonate (=2% $TiO_2$, based on pigment) in 100 ml of isopropanol. The suspension is then stirred for 1 hour and heated to 60° C. The pH is then made alkaline by addition of 1N NaOH. The suspension is stirred for a further 4 hours and, after cooling, the product is isolated as described in Example (8b).

EXAMPLE 23

10 g of C.I. Pigment Yellow 110 are dispersed in 100 ml of water in the presence of 1 g of zirconium (IV) acetylacetonate (=2.5% $ZrO_2$, based on pigment). The pH is raised to 8.5 by addition of 1N NaOH. The suspension is stirred for 2¾ hours, during which time the pH falls gradually to 7.2. The pH is again raised to 8.5 and the suspension is stirred for 3 hours. Then a solution of 7.8 g of $Al_2(SO_4)_3.18H_2O$ (=12% $Al_2O_3$, based on pigment) in 50 ml of water and a solution of 2N NaOH are added simultaneously to the above suspension over 1 hour, whereupon the pH first falls to 6.5 and then should remain constant. Thereafter the suspension is stirred for 3 hours at 80°-90° C. After cooling, the product is isolated by filtration, washed with water and dried at 80° C. in a vacuum drying oven.

USE EXAMPLES 24-33

To determine the flow properties, the compositions of this invention listed in the following Table, as well as the corresponding untreated pigments, are incorporated in conventional manner into an alkyd paint system (Setal ® 84, Kunstharzfabriek Synthesis B.V., Holland; solids content: 70% by weight).

The flow properties of the mill base so obtained, which contains 9% by weight of pigment and 40.5% by weight of total solids, and whose pigment/binder ratio is 0.3, are determined with a HAAKE viscosimeter (®Rotovisco RV 12; measuring temperature: 25° C., measuring system: SV-SP, shear range: D=0-100 [1/s]). For simple characterisation of the flow curve, viscosity values at D=10 [1/s] and 100 [1/s], calculated from an optimum regression curve, can be cited.

Lower values denote enhanced flow properties.

| Ex-ample | Composition | Viscosity values in mPa.s at D = 10 [l/s] | at D = 100 [l/s] |
|---|---|---|---|
| 24 | C.I. Pigment Yellow 110 + titanium isopropylate (Example 4) | 1151 | 198 |
| 25 | C I. Pigment Yellow 110 + $SnCl_2(acac)_2$² (Example 5) | 975 | 229 |
| 26 | C.I. Pigment Yellow 110 + tetraethoxy silicate (Example 6) | 832 | 168 |
| 27 | C I. Pigment Red 255 + $Zr(acac)_4$ (Example 7) | 419 | 97 |
| 28 | C.I. Pigment Yellow 110 + titanium isopropylate + $SiO_2$ (Example 12) | 885 | 193 |
| 29 | C.I. Pigment Yellow 110 + $SnCl_2(acac)_2$ + $SiO_2$ (Example 13) | 858 | 162 |
| 30 | C.I. Pigment Yellow 110 + tetraethoxy silicate + $SiO_2$ (Example 14) | 725 | 158 |

-continued

| Example | Composition | Viscosity values in mPa.s at D = 10 [l/s] | at D = 100 [l/s] |
|---|---|---|---|
| 31 | C.I. Pigment Red 255 + Zr(acac)$_4$ + SiO$_2$ (Example 15) | 222 | 81 |
| 32 | C.I. Pigment Red 255 + Zr(acac)$_4$ Al$_2$O$_3$ (Example 16) | 366 | 97 |
| 33 | C.I. Pigment Red 255 + Zr(acac)$_4$ + SiO$_2$ + Al$_2$O$_3$ (Example 18) | 373 | 96 |

$^2$acac = acetylacetonate

The viscosity values reported in the following Table are obtained with the corresponding untreated pigments.

| Pigment | Viscosity values in mPa.s at D=10 [l/s] | at D=100 [l/s] |
|---|---|---|
| C.I. Pigment Yellow 110 | 1320 | 297 |
| C.I. Pigment Red 225 | 448 | 108 |

USE EXAMPLES 34–37

To determine the flow properties, the compositions of this invention listed in the following Table, as well as the corresponding untreated pigments, are incorporated in a conventional manner into an alkyd paint system (®Setal 84, Kunstharzfabriek Synthesis B.V., Holland; solids content: 70% by weight).

The flow properties of the mill base so obtained, which contains 12% by weight of pigment and 54% by weight of total solids, and whose pigment/binder ratio is 0.3, are determined with a HAAKE viscosimeter (®Rotovisco RV 12; measuring temperature: 25° C., measuring system: SV-SP, shear range: D=0–100 [1/s]). For simple characterisation of the flow curve, viscosity values at D=10 [1/s] and 100 [1/s], calculated from an optimum regression curve, can be cited.

Lower values denote enhanced flow properties.

| Example | Composition | Viscosity values in mPa.s at D=10 [l/s] | at D=100 [l/s] |
|---|---|---|---|
| 34 | C.I. Pigment Red 254 + zirconium isopropylate (Example 20) | 397 | 164 |
| 35 | C.I. Pigment Red 254 + Zr(acac)$_4$ (Example 21) | 356 | 172 |
| 36 | C.I. Pigment Yellow 110 + Ti(isopropoxy)$_2$(acac)$_2$ (Example 22) | 1824 | 332 |
| 37 | C.I. Pigment Yellow 110 + Zr(acac)$_4$ + Al$_2$O$_3$ (Example 23) | 1989 | 440 |

The viscosity values reported in the following Table are obtained with the corresponding untreated pigments.

| Pigment | Viscosity values in mPa.s at D=10 [l/s] | at D=100 [l/s] |
|---|---|---|
| C.I. Pigment Red 254 | 663 | 315 |
| C.I. Pigment Yellow 110 | 3782 | 833 |

What is claimed is:

1. A composition containing an organic pigment coated with metal oxides, wherein the pigment particles are provided with a tenacious, dense, highly crosslinked coating of silica and/or alumina which is fixed by polycondensation of a silicate and/or aluminate with the free hydroxyl groups of a layer that densely coats the surface of the pigment particles and which consists substantially of partially hydrolysed compounds of elements of group 4A or 4B of the Periodic Table selected from the group consisting of chelates of formula

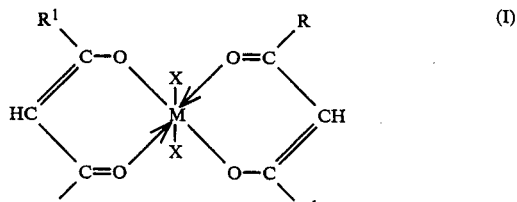

or

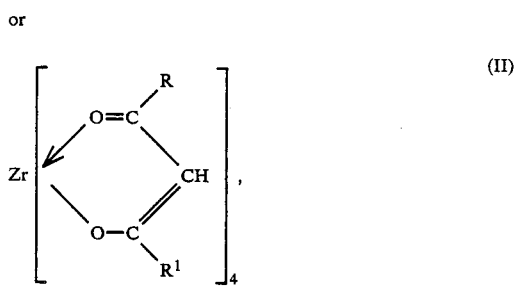

wherein R is methyl, ethyl, methoxy or ethoxy, R$^1$ is methyl or ethyl and X is halogen or C$_1$–C$_4$alkoxy, and M is Ti or Sn, and of esters of formula $$Q(OR^2)_4 \qquad (III),$$

wherein Q is an element of group 4A or 4B of the Periodic Table and R$^2$ is C$_1$–C$_4$alkyl.

2. A composition according to claim 1, wherein the coating consists of silica.

3. A composition according to claim 1, wherein the coating consists of silica and is obtained by using sodium silicate.

4. A composition according to claim 1, wherein the coating consists of alumina.

5. A composition according to claim 1, wherein the coating consists of alumina and is obtained by using sodium aluminate or aluminium sulfate.

6. A composition according to claim 1, wherein the coating consists of silica and alumina.

7. A composition according to claim 1 which contains chelates of formula I or II, wherein R is methyl or ethoxy and R$^1$ is methyl.

8. A composition according to claim 1 which contains chelates of formula I, wherein M is Ti and X is C$_1$–C$_4$-alkoxy.

9. A composition according to claim 1 which contains chelates of formula I, wherein M is Sn and X is chlorine.

10. A composition according to claim 1 which contains esters of formula III, wherein Q is Si, Ti or Zr and R$^2$ is ethyl, n-propyl, isopropyl or n-butyl.

11. A composition according to claim 1, wherein the pigment is selected from the group consisting of diketopyrrolopyrrole, isoindolinone or metal complex pigments.

12. A composition according to claim 1, wherein the compound of formula I, II or III is present in an amount of 1 to 15% by weight, calculated in each case as oxide, based on the pigment.

13. A composition according to claim 1 which contains silica and/or alumina in an amount of 0.5 to 50% by weight, based on the pigment.

14. A composition containing an organic pigment, the particles of which are coated with a dense layer which consists substantially of partially hydrolysed organic compounds of elements of group 4A or 4B of the Periodic Table selected from the group consisting of chelates of formula

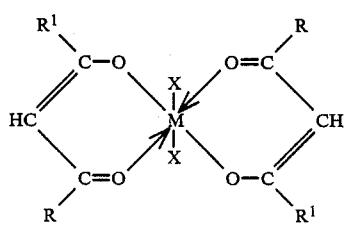 (I)

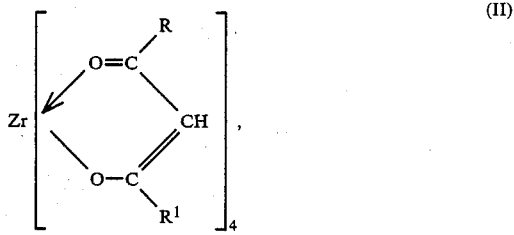 (II)

wherein R is methyl, ethyl, methoxy or ethoxy, $R^1$ is methyl or ethyl and X is halogen or $C_1$–$C_4$alkoxy, and M is Ti or Sn, and of esters of formula $$Q(OR^2)_4 \quad (III),$$

wherein Q is an element of group 4A or 4B of the Periodic Table and $R^2$ is $C_1$–$C_4$alkyl.

15. High molecular organic material containing a composition as claimed in claim 1.

16. High molecular organic material containing a composition as claimed in claim 14.

* * * * *